United States Patent [19]

Sidi

[11] 4,193,890

[45] Mar. 18, 1980

[54] COLOR STABILIZERS FOR VINYL CHLORIDE RESINS

[75] Inventor: Henri Sidi, Paramus, N.J.

[73] Assignee: Tenneco Chemicals, Inc., Saddle Brook, N.J.

[21] Appl. No.: 916,330

[22] Filed: Jun. 15, 1978

Related U.S. Application Data

[60] Division of Ser. No. 879,416, Feb. 21, 1978, Pat. No. 4,150,219, Continuation-in-part of Ser. No. 784,998, Apr. 6, 1977, Pat. No. 4,139,697.

[51] Int. Cl.$^2$ ............................................. C09K 15/06
[52] U.S. Cl. ............................... 252/407; 260/45.8 A; 528/491; 525/386
[58] Field of Search .................. 252/407; 260/45.8 H; 526/56; 528/491

[56] References Cited

U.S. PATENT DOCUMENTS

| | | | |
|---|---|---|---|
| 2,993,034 | 7/1961 | Swern | 260/45.8 A |
| 3,050,783 | 8/1962 | Pirot | 260/45.8 A |

*Primary Examiner*—Richard D. Lovering
*Assistant Examiner*—Irwin Gluck
*Attorney, Agent, or Firm*—Evelyn Berlow

[57] ABSTRACT

The discoloration that vinyl chloride resins usually undergo when a slurry containing one of these resins is heated at a temperature above 70° C. to reduce its monomer content to less than 10 ppm is minimized or prevented by carrying out the heating step in the presence of a monomer-miscible color stabilizer that comprises an epoxide and an organic peroxide.

9 Claims, No Drawings

COLOR STABILIZERS FOR VINYL CHLORIDE RESINS

This is a division of my copending application Ser. No. 879,416, which was filed on Feb. 21, 1978 and is now U.S. Pat. No. 4,150,219 and which is a continuation-in-part of copending application Ser. No. 784,998, which was filed on Apr. 6, 1977 and is now U.S. Pat. No. 4,139,697.

This invention relates to color stabilizers for vinyl chloride resins. More particularly, it relates to color stabilizers that minimize or prevent discoloration of the resins during the removal of residual vinyl chloride from slurries of vinyl chloride homopolymers or co-polymers by heating at temperatures above 70° C.

When vinyl chloride or a mixture of vinyl chloride and a comonomer is polymerized in an aqueous medium by suspension or emulsion polymerization techniques, there is obtained a slurry that contains from 5% to 50% by weight of vinyl chloride resin and up to 5% by weight of residual vinyl chloride. Most of the unreacted monomer is usually removed by heating the slurry under vacuum to about 65° C. As it is ordinarily practiced, this stripping procedure reduces the monomer content of the slurry to about 100 ppm to 20,000 ppm. Further processing yields dry products that may contain 100 ppm or more monomer.

In view of the recently-developed safety standards that require that the amount of vinyl chloride in vinyl chloride resins and in the atmosphere be maintained at very low levels, it is necessary that the monomer content of vinyl chloride resin slurries be sufficiently reduced so that these requirements can be met. Among the most effective procedures that have been developed for the removal of residual monomer from vinyl chloride resin slurries are those that involve heating the slurries at temperatures above 70° C. until the unreacted monomer has been removed. One such process is disclosed in copending application Ser. No. 482,112, which was filed by Feldman et al. on June 24, 1974. In this process, a vinyl chloride resin slurry or latex that contains from 100 ppm to 15,000 ppm by weight of vinyl chloride is heated at 70° C. to 125° C. and the evolved vinyl chloride vapor is removed until the slurry or latex contains less than 50 ppm and preferably less than 10 ppm of monomer. While this heat treatment effectively removes vinyl chloride from the slurry or latex, it often causes some deterioration of the resin as is evidenced by its development of color. Although the slight decomposition that the resin undergoes during heating to reduce its monomer content does not detract to any appreciable extent from its physical and mechanical properties, the discoloration seriously restricts its use in many applications.

In copending patent application Ser. No. 690,202, which was filed on May 25, 1976, Feldman disclosed a process in which the discoloration that vinyl chloride resins undergo when slurries containing them are heated at temperatures above 70° C. for a sufficient time to reduce their monomer content to the required very low levels is reduced by carrying out the heating step in the presence of a water-soluble oxidizing agent, such as oxygen, hydrogen peroxide, sodium perborate, and potassium persulfate. In U.S. Pat. No. 4,139,697, I disclosed the use of monomer-miscible organic peroxides and/or organic azo compounds as color stabilizers for slurries of vinyl halide resins that are heated at temperatures above 70° C. for a sufficient time to reduce their monomer contents to less than 10 ppm.

It has now been found that the discoloration of vinyl chloride resins that usually occurs when slurries containing the resins are heated at a temperature above 70° C. until their monomer content has been reduced to less than 10 ppm can be minimized or prevented by carrying out the heating step in the presence of a monomer-miscible color stabilizer that comprises an epoxide having 2 to 22 carbon atoms and an organic peroxide. This treatment results in the recovery of lighter and brighter resins. In this process, a slurry that contains from 5% to 50% by weight of a vinyl chloride homopolymer or copolymer and from 100 ppm to 15,000 ppm of vinyl chloride is heated at a temperature between 70° C. and 100° C. at atmospheric, subatmospheric, or superatmospheric pressure in the presence of a monomer-miscible color stabilizer, and the evolved vinyl chloride is removed until the slurry contains less than 10 ppm and preferably less than 1 ppm of vinyl chloride. The treated slurry is then further processed to yield a vinyl chloride resin that contains less than 10 ppm and in most cases less than 1 ppm of vinyl chloride.

The color stabilizers that are used in this process comprise epoxides and organic peroxides that are miscible with vinyl chloride and that do not impart color or odor to the slurries or to the vinyl chloride resins in the slurries.

The epoxides that can be used in the color stabilizers of this invention are vicinal epoxides having 2 to 22 carbon atoms. A preferred group of epoxides consists of epoxides having 2 to 8 carbon atoms, such as ethylene oxide, propylene oxide, butylene oxide, epichlorohydrin, epibromohydrin, epoxyethylbenzene, allyl glycidyl ether, vinyl cyclohexene oxide, glycide, styrene oxide, glycidyl acrylate, and glycidyl methacrylate. Another preferred group of epoxides consists of epoxidized fatty acids having 16 to 18 carbon atoms, esters of those epoxidized fatty acids, and mixtures thereof. Illustrative of this group of epoxides are epoxidized cottonseed oil, epoxidized soybean oil, epoxidized linseed oil, epoxidized tall oil, methyl epoxystearate, butyl epoxystearate, tridecyl epoxystearate, and butyl epoxytallate. A single monomer-miscible epoxide or a mixture of two or more of these compounds may be used.

The organic peroxides that can be used in combination with the epoxide in the color stabilizers of this invention have the structural formula

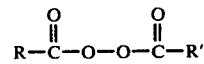

wherein R and R' each represents an alkyl group having 2 to 12 carbon atoms, a haloalkyl group having 2 to 12 carbon atoms, an aryl group having 6 to 10 carbon atoms, or a haloaryl group having 6 to 10 carbon atoms. Examples of these organic peroxides are diacetyl peroxide, dipropionyl peroxide, di-n-butyryl peroxide, diisobutyryl peroxide, diisovaleryl peroxide, bis-(2-ethylhexanoyl)peroxide, dipelargonyl peroxide, dilauroyl peroxide, bis(3,5,5-trimethylhexanoyl)peroxide, acetyl pelargonyl peroxide, chloroacetyl chlorocaproyl peroxide, caproyl lauroyl peroxide, bis(2-chlorolauroyl)peroxide, 2-chlorolauroyl lauroyl peroxide, 2-ethylhexanoyl 2-bromolauroyl peroxide, bis-(2-bromopelargonyl) peroxide, dibenzoyl peroxide, bis(o-methoxybenzoyl)peroxide, bis(o-methylbenzoyl)peroxide, bis(tert.butylbenzoyl)peroxide, bis(2-chloro-4-tert-butylbenzoyl)peroxide, bis(2,4-dibromobenzoyl)peroxide, bis(2,4,6-trichlorobenzoyl)peroxide, acetyl benzoyl peroxide, butyryl 2,4-dichlorobenzoyl peroxide, lauroyl benzoyl peroxide, benzoyl o-chlorobenzoyl peroxide, 2-chlorolauroyl o-methylbenzoyl peroxide, and mixtures thereof.

The color stabilizers contain from 50% to 95% by weight of the epoxide and 5% to 50% by weight of the organic peroxide. They preferably contain 75% to 90% by weight of the epoxide and 10% to 25% by weight of the organic peroxide.

The amount of the color stabilizer used is that which will prevent discoloration of the vinyl chloride resin when a slurry that contains the resin is heated at a temperature above 70° C. for a time sufficient to reduce its vinyl chloride content to less than 10 ppm without causing foaming or other handling problems. It is dependent upon such factors as the choice of epoxide and organic peroxide, the temperature at which the slurry is heated, the length of the heating period, and the monomer content of the slurry. In most cases, 0.2 part to 5 parts by weight of the color stabilizer per 100 parts by weight of vinyl chloride resin in the slurry will prevent discoloration of the resin during the heating treatment. Larger amounts of the color stabilizer can be used, but they generally do not provide additional improvement in the color of the product. Particularly advantageous results have been obtained when the slurry was heated in the presence of from 0.3 part to 3 parts by weight of the color stabilizer per 100 parts by weight of vinyl chloride resin.

The color stabilizer, a solution of the color stabilizer in a carrier solvent such as vinyl acetate, the individual components of the color stabilizer, or solutions of the individual components may be added to the slurry that contains the vinyl chloride resin before the heating of the slurry is begun or added either portionwise or continuously during the heating period.

As used herein, the term "vinyl chloride resin" includes both the high molecular weight homopolymers of vinyl chloride and the high molecular weight copolymers formed by the copolymerization of vinyl chloride with an essentially water-insoluble, ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer component contains at least 70% and preferably 80% to 90% of vinyl chloride.

The vinyl chloride resin slurries that are treated with the novel color stabilizers to prevent discoloration of the polymer during processing to remove residual vinyl chloride from them may be prepared by the well-known suspension or emulsion polymerization processes. In the suspension polymerization processes, the monomer is suspended in water by a suspending agent and agitation. The polymerization is initiated with a free-radical-generating polymerization initiator, such as dilauroyl peroxide, dibenzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. The reaction mixtures produced by these processes are usually heated under vacuum to about 60° C. to 65° C. to remove most of the unreacted monomer from them. The resulting stripped slurries generally contain 5% to 50% and preferably 15% to 40% by weight of vinyl chloride resin as particles that range in size from about 5 microns to 200 microns and from about 100 ppm to 15,000 ppm of vinyl chloride. Following the removal of vinyl chloride from them, the slurries may be dewatered, for example, on a rotary drum filter, and then dried, or they may be spray dried. The vinyl chloride resins prepared in this way have excellent brightness and color and usually contain less than 1 ppm of vinyl chloride.

The invention is further illustrated by the following examples. In these examples, all parts are parts by weight and all percentages are percentages by weight.

EXAMPLE 1

A. An aqueous slurry of a vinyl chloride/vinyl acetate copolymer was prepared by heating in an autoclave at 65° C. for 18 hours a polymerization system that contained 85 parts of vinyl chloride, 15 parts of vinyl acetate, 185 parts of deionized water, 0.125 part of dilauroyl peroxide, 1.75 parts of gelatin, and 0.69 part of trichloroethylene. The slurry was heated under vacuum at a temperature below 65° C. to reduce its vinyl chloride content to less than 5000 ppm.

B. Sixteen hundred grams of the slurry, which contained 32.5% of the vinyl chloride/vinyl acetate copolymer, was charged together with 10.4 grams of epichlorohydrin and 2 grams of dibenzoyl peroxide into a 2000 ml. reaction flask that was equipped with a thermometer, a stirrer, a condenser, and a nitrogen inlet tube. The reaction flask was immersed in a water bath. The slurry was stirred and gradually heated while nitrogen was passed over its surface at the rate of about 0.5 cubic feet per hour. A 100 ml. sample of the slurry was taken when the treated slurry reached 90°–92° C. and an additional 100 ml. sample was taken after the slurry had been heated at 90°–92° C. for one hour. The samples were filtered, and the wet solids were dried for 12 hours at 40°–45° C. in a forced air drying oven and then crushed. The copolymer obtained by drying the final sample contained less than 1 ppm of vinyl chloride.

The colors of the initial sample and the final sample of the dry, crushed copolymer were measured by reflectance using a Hunter Color Meter, Model D-25, which gives readings directly from the polymer surface. The results obtained are given in Table I. In this table, the L value relates to the brightness of the polymer, that is, to the percentage of the light that is reflected, with a perfectly white polymer having an L value of 100. The a and b values relate to hue. Positive a denotes red, negative a denotes green, positive b denotes yellow, and negative b denotes blue.

COMPARATIVE EXAMPLE A

The procedure described in Example 1B was repeated except that no color stabilizer was added to the slurry before it was heated to reduce its monomer content. The copolymer obtained by drying the final sample contained less than 1 ppm of vinyl chloride. The colors of the initial and final samples of the dry, crushed copolymer, as measured by reflectance, are given in Table I.

C. for 2 hours. The colors of the samples of dry crushed polyvinyl chloride, as measured by reflectance, are given in Table II.

EXAMPLE 5

Table I

Color Stabilization of Vinyl Chloride/Vinyl Acetate Copolymer During Heating

| Ex. No. | Color Stabilizer Added | Amount of Color Stabilizer Added (PHR) | Slurry Treatment | Reflectance of Vinyl Chloride/Vinyl Acetate Copolymers | | | | | |
|---|---|---|---|---|---|---|---|---|---|
| | | | | Initial Sample | | | Final Sample | | |
| | | | | L | a | b | L | a | b |
| 1 | Epichlorohydrin Dibenzoyl peroxide | 2.00 0.38 | 1 Hour at 90°-92° C. | 96.60 | +0.65 | +2.85 | 97.65 | −0.20 | +3.40 |
| Comp. Ex. A | None | — | 1 Hour at 90°-92° C. | 96.70 | +1.25 | +3.30 | 94.35 | +2.15 | +5.00 |

EXAMPLES 2-4

Sixteen hundred grams of a slurry that contained about 32% of polyvinyl chloride was charged together with an epoxide and an organic peroxide into a 2000 ml. reaction flask equipped with a thermometer, a stirrer, a condenser, and a nitrogen inlet tube. The flask was immersed in a water bath. The slurry was stirred and gradually heated to 95° C. while nitrogen was passed over its surface at the rate of 0.5 cubic feet per hour. After the slurry had been heated at 95° C. for two hours, a 100 ml. sample was taken. The sample was filtered, and the wet solids were dried for 12 hours at 40°-45° C. in a forced air drying oven and then crushed. The dry polyvinyl chloride contained less than 1 ppm of vinyl chloride.

The colors of the samples of dry crushed polyvinyl chloride were measured by the procedure described in Example 1. The color stabilizers used and the results obtained are given in Table II.

COMPARATIVE EXAMPLES B AND C

The procedure described in Examples 2-4 was repeated except that no color stabilizer was added to the slurry. In Comparative Example B, the slurry was not heated; in Comparative Example C, it was heated at 95°

The procedure described in Examples 2-4 was repeated except that the slurry was heated for 2 hours at 95° C. under a vacuum of 3 inches. The results obtained are given in Table II.

COMPARATIVE EXAMPLE D

The procedure described in Example 5 was repeated except that no color stabilizer was added to the slurry. The results obtained are given in Table II.

From the data in Tables I and II, it will be seen that the addition of a monomer-miscible color stabilizer that contains an epoxide and an organic peroxide to a vinyl chloride resin slurry that was to be maintained at an elevated temperature until its monomer content had fallen below 1 ppm resulted in the recovery of a lighter-colored and brighter product than was obtained in the absence of a color stabilizer.

Table II

Color Stabilization of Polyvinyl Chloride During Heating

| Ex. No. | Color Stabilizer Added | Amount of Color Stabilizer Added (PHR) | Slurry Treatment | Reflectance of Polyvinyl Chloride | | |
|---|---|---|---|---|---|---|
| | | | | L | a | b |
| 2 | Epichlorohydrin Dibenzoyl peroxide | 1.00 0.25 | 2 Hrs. at 95° C. at atmospheric pressure | 98.12 | +0.40 | +0.94 |
| 3 | Epoxidized soybean oil* Dibenzoyl peroxide | 1.00 0.25 | 2 Hrs. at 95° C. at atmospheric pressure | 98.18 | +0.30 | +0.96 |
| 4 | Epoxidized soybean oil* Dibenzoyl peroxide | 0.35 0.10 | 2 Hrs. at 95° C. at atmospheric pressure | 98.06 | −0.06 | +1.26 |
| Comp. Ex. B | None | — | None | 98.36 | +0.22 | +0.72 |
| Comp. Ex. C | None | — | 2 Hrs. at 95° C. at atmospheric pressure | 97.06 | +0.48 | +1.09 |
| 5 | Epichlorohydrin Dibenzoyl peroxide | 1.00 0.25 | 2 Hrs. at 95° C. under 3" vacuum | 96.80 | +0.40 | +1.70 |
| Comp. Ex. D | None | — | 2 Hrs. at 95° C. under 3" vacuum | 95.36 | +1.12 | +1.62 |

*NUOPLAZ ® 849 (Tenneco Chemicals Inc.)

What is claimed is:

1. A vinyl chloride-miscible color stabilizer for vinyl chloride resins that contains 50% to 95% by weight of an epoxide selected from the group consisting of vicinal epoxides having 2 to 8 carbon atoms, epoxidized fatty acids having 16 to 18 carbon atoms, esters of these epoxidized fatty acids, and mixtures thereof and 5% to 50% by weight of an organic peroxide having the structural formula

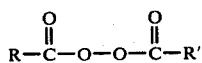

wherein R and R' each represents an alkyl group having 2 to 12 carbon atoms, a chloroalkyl group having 2 to 12 carbon atoms, a bromoalkyl group having 2 to 12 carbon atoms, an aryl group having 6 to 10 carbon atoms, or a haloaryl group having 6 to 10 carbon atoms and 1 to 3 chlorine or bromine atoms.

2. A color stabilizer as defined in claim 1 that contains 75% to 90% by weight of said epoxide and 10% to 25% by weight of said organic peroxide.

3. A color stabilizer as defined in claim 1 wherein the epoxide is a vicinal epoxide having 2 to 8 carbon atoms.

4. A color stabilizer as defined in claim 1 wherein the epoxide is epichlorohydrin.

5. A color stabilizer as defined in claim 1 wherein the epoxide is a member of the group consisting of epoxidized fatty acids having 16–18 carbon atoms, esters of said acids, and mixtures thereof.

6. A color stabilizer as defined in claim 1 wherein the epoxide is epoxidized soybean oil.

7. A color stabilizer as defined in claim 1 wherein the organic peroxide is dibenzoyl peroxide.

8. A color stabilizer as defined in claim 1 that contains epichlorohydrin and dibenzoyl peroxide.

9. A color stabilizer as defined in claim 1 that contains epoxidized soybean oil and dibenzoyl peroxide.

* * * * *